United States Patent [19]

Newell

[11] 3,769,650
[45] Nov. 6, 1973

[54] BATTERY TERMINAL CLEANER AND SHAPER

[76] Inventor: Carl W. Newell, 955 Avonoak Terrace, Glendale, Calif.

[22] Filed: Oct. 20, 1972

[21] Appl. No.: 299,376

[52] U.S. Cl.................... 15/105, 30/172, 82/1 R
[51] Int. Cl.................... B23d 79/08, B23b 5/16
[58] Field of Search................ 145/3.5; 82/1 R; 15/236 R, 104.04, 105, 104.02; 30/169, 172

[56] References Cited
UNITED STATES PATENTS 2,204,516  6/1940  Stone ............................. 15/236 R
3,221,709  12/1965  Montemayor ..................... 145/3.5
2,562,136  7/1951  Sullins ........................... 15/104.04 X Primary Examiner—Leon G. Machlin
Attorney—Thomas P. Mahoney et al.

[57] ABSTRACT

Transversely opposed body sections are assembled forming a body with different size battery terminal sockets opening at longitudinally opposed body ends. A particularly formed blade pocket is transversely adjacent each socket, the blade pockets being face exposed prior to body section assembly and receiving scraping blades therein extending edgewise into the body sockets when the body sections are assembled.

11 Claims, 7 Drawing Figures

PATENTED NOV 6 1973

3,769,650

BATTERY TERMINAL CLEANER AND SHAPER

BACKGROUND OF THE INVENTION

This invention relates to a battery terminal cleaner and shaper, and more particularly to such a device wherein a scraping blade or blades uniquely assembled therein provide improved operational results due to the particular positioning and retention of the blade or blades. Furthermore, the device of the present invention may preferably be formed of relatively economically, but precisely fabricated, split sections which prior to assembly, expose blade retaining pockets for ready insertion of the blade or blades into operable position and once sectional assembly is accomplished, the blade or blades automatically receive precise positioning for ultimate efficient functioning of the device. These and other attributes of the device of the present invention will be discussed and described in the following specification and claims.

In the use of the usual automotive type batteries, the electrical loads to be served by the batteries are connected thereto through electrical cables terminating in battery connectors. The cable battery connectors are telescoped over the respective battery posts, usually formed of a lead composition and secured thereto by circumferential clamping. Thus, the electrical connection between the battery and the particular electrical load depends on this clamping contact between the cable battery connectors and the battery posts.

It is a longstanding and well known problem with battery and electrical cable connections of this form that there can be a corrosion build up, particularly at the battery posts and between the battery posts and their respective cable battery connectors. As such corrosion occurs, the efficiency of the electrical connection between the battery posts and the cable battery connectors is gradually reduced, and if left to persist, will ultimately cause a complete electrical supply disruption. It is required, therefore, to perform periodic maintenance or corrosion removing operations on the various elements involved, as well as the removal of metal oxidations and surface dirt build ups.

The usual procedure for the maintenance operations is to remove the cable battery connectors from the battery posts, clean the respective elements and then reassemble the same. The cleaning of the cable battery connectors is not a particular problem since a generally cylindrical hole is presented and the interior surfaces can be scraped merely by the use of a scraping blade. The cleaning of the generally cylindrical surfaces of the mating battery posts is, however, not so readily accomplished in view of an outer curved surface being presented and it is for this specific purpose that various forms of battery post or terminal scraping devices have heretofore been provided.

Generally, these battery post or terminal scrapers have consisted of a member having a socket therein capable of being received over the particular battery terminal to be cleaned with some form of scraping blade projecting into the socket for performing the cleaning operation when the member is rotated relative to the particular battery terminal. These prior devices, although of a logical general form, have not been completely satisfactory in view of certain problems being presented therewith.

One of the major problems has been as a result of the mounting and the positioning of the scraping blades such that these blades are not firmly retained and a satisfactory cleaning operation cannot be performed. Another problem is the result of the usual battery construction in that each of the two battery terminals are of different size and it is impossible to perform a proper cleaning operation on both with the use of a single size tool. It is the solution of these major problems to which the present invention is directed, as well as increased simplicity for maximum economy in manufacture, while still retaining a maximum of efficiency in operation.

OBJECTS AND SUMMARY OF THE INVENTION

It is, therefore, an object of this invention to provide a battery terminal cleaner and shaper having an improved and unique blade positioning means incorporated therein for properly positioning the scraping blade thereof to efficiency perform its intended function. The battery terminal cleaner and scraper of the present invention may be formed of a body having a properly sized socket opening therein commensurate with the side of the particular battery terminal to be cleaned. Furthermore, a blade pocket is formed in the body opening edgewise into the body socket particularly positioned and configured for mounting a blade therein exactly retained projecting into the body socket for performing the cleaning and shaping of the battery terminal upon manipulation of the device as intended.

It is a further object of this invention to provide a battery terminal cleaner and shaper which may be formed of assemblable parts and fully exposing the blade pocket prior to such assembly so that the blade may be quickly and easily inserted during the assembly operation for proper and predetermined positioning and retention once the assembly operation has been completed. The body of the device is preferably formed of mating, longitudinally split parts or sections which prior to assembly fully face expose the blade pocket. Thus, the blade may be inserted into the blade pocket prior to such assembly and merely through a simple assembly operation, will be securely positioned and retained in proper relationship to the socket for efficient cleaning and shaping functions. Furthermore, through a unique inter-engaging body and blade configuration, there is always a complete assurance that the blade will be correctly positioned and equally importantly, firmly retained in such assembled positioning.

It is still a further object of this invention to provide a battery terminal cleaner and shaper of the foregoing type which may include oppositely opening body sockets therein, each of a different size properly predetermined for efficiently cleaning and shaping the two usual different sizes of battery terminals. With the exception of the body socket size differences, each of the sockets is virtually identically formed including the respective blade pockets and blade positioning. In this manner, one device or tool may be used for servicing both of the battery terminals of a single battery despite the variance between sizes of such battery terminals.

It is also an object of this invention to provide a battery terminal cleaner and shaper of the foregoing type and which satisfies all of the foregoing objects in a relatively simple and efficient manner, yet which may be formed for relatively inexpensive, but accurate, fabrication and assembly so as to be properly operable over a long period of useful life. The body sections or parts may be accurately molded of plastic incuding the uniquely formed blade pocket or pockets simultaneously molded therein. The blade is formed of metal with the blade and body final assembly being retained through conventional fasteners.

Other objects and advantages of the invention will be apparent from the following specification and the accompanying drawing which are for the purpose of illustration only.

Figure 1:
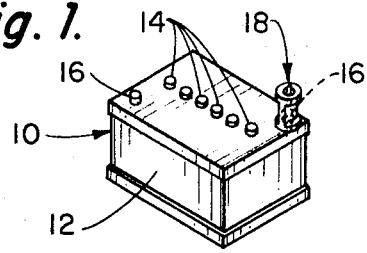
FIG. 1 is a perspective view of a conventional automotive-type battery having an embodiment of the battery terminal cleaner and scraper of the present invention operably positioned on one of the battery posts or terminals thereof.

DESCRIPTION OF THE BEST EMBODIMENT CONTEMPLATED:

Referring to the drawing, and particularly FIG. 1 thereof, a conventional, automotive-type battery, generally indicated at 10, is illustrated and includes a case 12, filler caps 14, and, more importantly, for purposes of the present invention, battery posts or terminals 16. The battery terminals 16 are formed of the usual lead-like materials. Furthermore, an embodiment of the battery terminal cleaner and shaper of the present invention, generally indicated at 18, is shown operably positioned on one of the battery terminals 16 ready for manipulation by hand for performing its intended function.

The battery terminal cleaner and scraper 18 is shown in enlarged detail in FIGS. 2 through 7 and includes a preferably molded plastic body 20 formed of longitudinally split parts or sections 22 and 24 which, when transversely assembled, show a longitudinally extended parting line 26 preferably on a continuous longitudinal flat plane. Furthermore, the body 20 includes flat, transversely extending, opposite end faces 28 and 30 having central, longitudinally extending, frusto-conical, battery terminal sockets 32 and 34 formed oppositely longitudinally therethrough and partially longitudinally into the body 20. Generally longitudinally centrally of the body 20, the sockets 32 and 34 are longitudinally connected by a reduced central opening 36.

Figure 4:
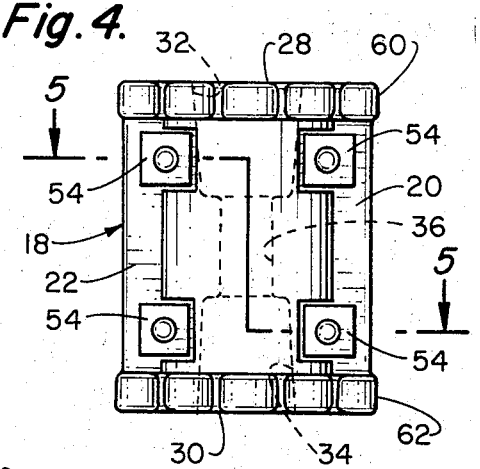
FIG. 4 is a side elevational view looking in the direction of the arrows 4—4 in FIG. 3.

As shown in hidden lines in FIG. 4 and in full lines in FIGS. 2, 5, 6 and 7, the sockets 32 and 34 with their frusto-conical shapes are generally circular in transverse cross-section throughout. At the same time, the transverse cross-section of the socket 32 is larger than the transverse cross-section of the socket 34. Specifically, the circular cross-sections and longitudinal depths of the sockets 32 and 34 are such as to receive the respective different size battery terminals nearly fully therein with a relatively close fit so that the body 20 may be positioned extending longitudinally to be received over one battery terminal and may merely be longitudinally reversed to be received over the other battery terminal.

A relatively thin blade pocket 38 is formed in the body 20 extending longitudinally along the socket 32 opening edgewise transversely inwardly into the socket and extending transversely edgewise outwardly from the socket within the body. A similarly formed and positioned blade pocket 40 is formed in the body 20 for the socket 34. These blade pockets 38 and 40 are similarly formed preferably recessed within the body section 24 and opening facewise against the body section 22 when these sections are assembled. Furthermore, the blade pockets 38 and 40 are formed with longitudinally directed recesses 42 and projections 44 for a purpose to be hereinafter described.

Figure 7:
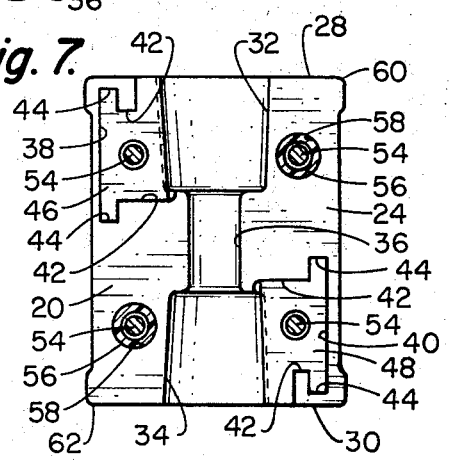
FIG. 7 is a vertical sectional view looking in the direction of the arrows 7—7 in FIG. 3.

A scraping blade 46 is received fully within the blade pocket 38 and a scraping blade 48 is received fully within the blade pocket 40, each blade projecting edgewise inwardly into its respective socket 32 and 34 a predetermined or measured distance preferably fully longitudinally along the respective blade pockets. The blades 46 and 48 preferably fully facewise conform exactly to the facewise contour of the blade pockets 38 and 40 as best seen in FIG. 7 so that the blade pocket longitudinal recesses and projections formed by the body 20 longitudinally inter-engage with corresponding longitudinal projections and recesses of the blades. With the body 20 in the preferred form fabricated with the two, longitudinally split sections 22 and 24, and the blade pockets 38 and 40 facewise recessed into the body section 24, the blade facewise thicknesses are preferably slightly larger than the facewise depths of the blade pockets in the body section 24, so that transverse assembly of the body sections 22 and 24 causes the face of the body section 22 at the parting line 26 to transversely abut and clamp the blades 46 and 48 within the blade pockets while the longitudinal inter-engagement of corresponding recesses and projections of the body and blades firmly retain the blades against any rocking or other movement in such assembly. The blades 46 and 48 preferably project transversely edgewise from the blade pockets 38 and 40 into the respective sockets 32 and 34 in the order of about five-thousandths of an inch completely longitudinally along the sockets and the blades are preferably formed of hardened metal, such as hardened steel.

Figure 2:
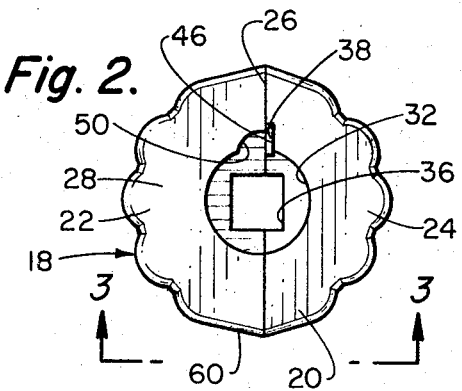
FIG. 2 is an enlarged, end elevational view of the embodiment of battery terminal cleaner and scraper removed from the battery of FIG. 1.
Figure 3:
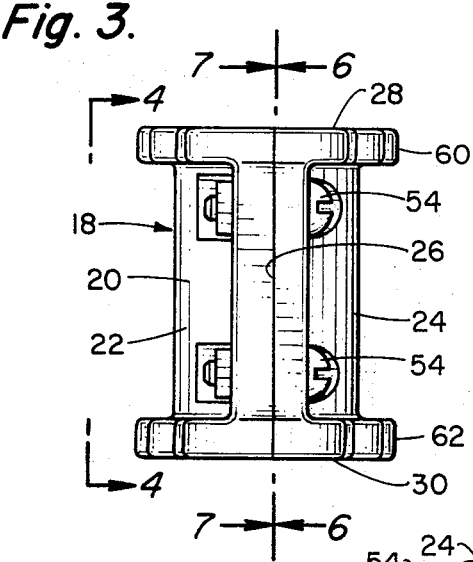
FIG. 3 is a side elevational view looking in the direction of the arrows 3—3 in FIG. 2.
Figure 5:
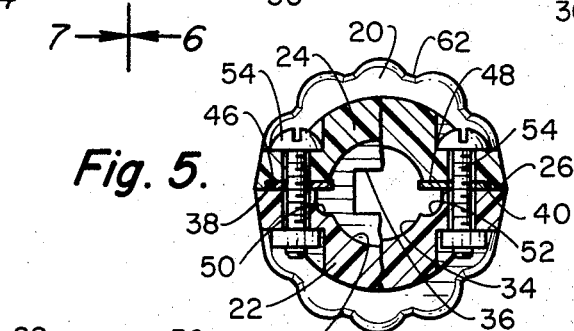
FIG. 5 is a horizontal sectional view looking in the direction of the arrows 5—5 of FIG. 4.

Again, in the preferred form, the body section 22 is formed with a debris recess 50 completely longitudinally along the socket 32 and a debris recess 52 completely longitudinally along the socket 34, each extending a short distance transversely outwardly from the sockets and opening transversely inwardly into said sockets. In assembly of the body sections 22 and 24, the debris recesses 50 and 52 open facewise against the blades 46 and 48, but only extend transversely outwardly a small fraction of the blade transverse outward projection as best seen in FIGS. 2 and 5 in such assembly, and separated from such assembly in FIG. 6.

Figure 6:
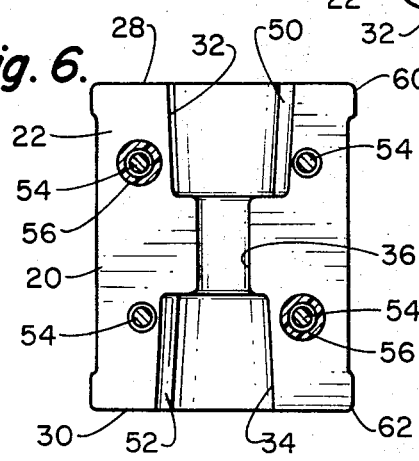
FIG. 6 is a vertical sectional view looking in the direction of the arrows 6—6 in FIG. 3.

Finally, the body sections 22 and 24 are retained in assembly securing the blades 46 and 48 in the blade pockets 38 and 40 by a series of conventional fasteners 54 extending transversely through the body sections transversely outwardly of the body sockets 32 and 34 and the debris recesses 50 and 52. Also, it is preferred that one of the fasteners 54 projects through each of the blades 46 and 48 to not only retain the body sections 22 and 24 transversely clamped facewise clamping the blades within the blade pockets 38 and 40, but likewise aiding in retaining the positioning of the blades within the blade pockets. As shown in FIGS. 6 and 7, it is furthermore preferred to form the body section 22 at the two fasteners 54 which do not project through the blades 46 and 48 with annular projections 56 assemblably received in appropriate recesses 58 of the body section 24 as a position retaining means between these sections. The fasteners 54 may be of the usual selectively removable form a shown for disassembly of the body sections 22 and 24 and the periodic replacement of the blades 46 and 48, or these fasteners may be of the usual permanently secured form not permitting such selective disassembly.

Thus, according to the principles of the present invention, and with the preferred embodiment of the battery terminal cleaner and shaper as described and illustrated, a device is provided having selectively useable oppositely opening battery terminal sockets 32 and 34 specifically formed for receiving the usual two sizes of battery terminals 16 respectively in the opposite ends thereof. The blades 46 and 48 are retained exactly positioned projecting a determined distance into the sockets 32 and 34 for properly cleaning and shaping the battery terminals 16 by scraping such terminals upon the usual rotative manipulation of the device. During such battery terminal scraping, particles of debris are collected within the debris recesses 50 and 52 falling therefrom or removed periodically during use of the device. As shown in the drawing, the configurations of the body sections 22 and 24 may be such that when these body sections are assembled, transversely projecting end portions 60 and 62, somewhat knurled in outer configuration may be provided to aid in gripping the body 20 during use of the device.

I claim:

1. In a battery terminal cleaner and shaper, the combination of: a longitudinally extending body terminating at a transversely extending end face; a longitudinally extending socket formed in said body through said end face, said socket being generally circular in transverse cross section and dimensioned to receive a battery terminal therein; a longitudinally extending parting line transversely through said body intercepting said body socket forming said body of two assemblable longitudinally extending sections; a blade pocket formed in said body at said body parting line and opening edgewise into said body socket, said blade pocket being fully exposed facewise at said parting line prior to assembly of said body sections, a blade positioned in said body blade pocket projecting edgewise a determined distance into said body socket upon said body sections being assembled; fastening means securing said body sections assembled and said blade positioned in said body blade pocket.

2. The battery terminal cleaner and shaper as defined in claim 1 in which said body includes body parts engaging portions of at least three blade edges at said blade pocket when said body sections are assembled.

3. The battery terminal cleaner and shaper as defined in claim 1 in which longitudinally projecting and recessed portions of said body and blade at longitudinally opposite edges of said blade are interengaged at least when said body sections are assembled.

4. The battery terminal cleaner and shaper as defined in claim 1 in which said fastening means includes a fastener extending through portions of each of said body sections and blade.

5. The battery terminal cleaner and shaper as defined in claim 1 in which said body sections are molded plastic sections and said blade is a metal blade.

6. The battery terminal cleaner and shaper as defined in claim 1 in which a longitudinally extending debris recess means is formed in said body and opening transversely into said socket partially exposing a blade face outwardly beyond said circular cross-section of said socket for receiving debris therein scraped by said blade.

7. The battery terminal cleaner and shaper as defined in claim 1 in which said body socket is a first socket and a second longitudinally extending socket is formed in said body through a transversely extending end face of said body opposite from said first body end face; in which said second body socket is formed similarly to said first body socket including said generally circular transverse cross-section, the relationship of said body parting line, a blade pocket, a second blade, and the relationship of said fastening means; and in which said second blade pocket is of different circular transverse cross-section from said first blade socket.

8. The battery terminal cleaner and shaper as defined in claim 1 in which parts of said body engage portions of at least three blade edges at said blade pocket at least when said body sections are assembled including longitudinally projecting and recessed body parts and blade portions interengaged at blade longitudinally opposite edges.

9. The battery terminal cleaner and shaper as defined in claim 1 in which longitudinally projecting and recessed portions of said body and blade at longitudinally opposite edges of said blade are interengaged at least when said body sections are assembled; and in which said body sections are molded plastic sections and said blade is a metal blade.

10. The battery terminal cleaner and shaper as defined in claim 1 in which said body socket is a first socket and a second longitudinally extending socket is formed in said body through a transversely extending end face of said body opposite from said first body end face; in which said second body socket is formed similarly to said first body socket including said generally circular transverse cross-section, the relationship of said body parting line, a blade pocket, a second blade, and the relationship of said fastening means; in which said second blade pocket is of different circular transverse cross-section from said first blade socket; and in which said fastening means includes a fastener through portions of each of said body sections and said blade at each of said first and second body sockets.

11. The battery terminal cleaner and shaper as defined in claim 1 in which said body socket is a first socket and a second longitudinally extending socket is formed in said body through a transversely extending end face of said body opposite from said first body end face; in which said second body socket is formed similarly to said first body socket including said generally circular transverse cross-section, the relationship of said body parting line, a blade pocket, a second blade, and the relationship of said fastening means, in which said second blade pocket is of different circular transverse cross-section from said first blade socket; in which parts of said body engage portions of at least three blade edges of each of said blades at the respective of said blade pockets at least when said body sections are assembled; in which said fastening means includes a fastener through portions of said body sections and said blade at each of said first and second body sockets; in which said body sections are molded plastic sections and said blades are metal blades; and in which longitudinally extending debris recess means are formed in said body and opening transversely into each of said first and second body sockets partially exposing a blade face outwardly beyond respective of said socket circular cross-sections for receiving debris therein scraped by the respective of said blades.

* * * * *